(12) United States Patent
Oh et al.

(10) Patent No.: US 11,491,764 B2
(45) Date of Patent: Nov. 8, 2022

(54) IRON-ALUMINUM-BASED PLATED STEEL SHEET FOR HOT PRESS FORMING, HAVING EXCELLENT HYDROGEN DELAYED FRACTURE PROPERTIES AND SPOT WELDING PROPERTIES, AND MANUFACTURING METHOD THEREFOR

(71) Applicant: POSCO, Pohang-si (KR)

(72) Inventors: Jin-Keun Oh, Gwangyang-si (KR);
Seong-Woo Kim, Gwangyang-si (KR);
Sang-Heon Kim, Gwangyang-si (KR);
Yeol-Rae Cho, Pohang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/297,753

(22) PCT Filed: Nov. 29, 2019

(86) PCT No.: PCT/KR2019/016766
§ 371 (c)(1),
(2) Date: May 27, 2021

(87) PCT Pub. No.: WO2020/111883
PCT Pub. Date: Jun. 4, 2020

(65) Prior Publication Data
US 2022/0040957 A1     Feb. 10, 2022

(30) Foreign Application Priority Data

Nov. 30, 2018 (KR) .................. 10-2018-0152573
Nov. 29, 2019 (KR) .................. 10-2019-0156854

(51) Int. Cl.
| | |
|---|---|
| *B32B 15/01* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/28* | (2006.01) |

(Continued)

(52) U.S. Cl.
CPC .......... *B32B 15/012* (2013.01); *C22C 38/001* (2013.01); *C22C 38/002* (2013.01);
(Continued)

(58) Field of Classification Search
CPC ... B32B 15/012; C22C 38/001; C22C 38/002; C22C 38/02; C22C 38/04; C22C 38/06; C22C 38/28; C22C 38/32; C23C 2/12
(Continued)

(56) References Cited

U.S. PATENT DOCUMENTS 6,296,805 B1    10/2001  Laurent et al.
10,590,522 B2    3/2020  Oh et al.
(Continued)

FOREIGN PATENT DOCUMENTS

EP    0743374 A1    11/1996
JP    S61-104091 A    5/1986
(Continued)

OTHER PUBLICATIONS

Rae et al., KR 2015/0075435 A Google Patents machine translation, Jul. 6, 2015, entire translation (Year: 2015).*
(Continued)

*Primary Examiner* — Humera N. Sheikh
*Assistant Examiner* — Katherine A Christy
(74) *Attorney, Agent, or Firm* — Morgan, Lewis & Bockius LLP

(57) ABSTRACT

The present invention provides an iron-aluminum-based plated steel sheet, and a manufacturing method therefor, the iron-aluminum-based plated steel sheet comprising a base steel sheet and a plated layer formed on the surface of the base steel sheet, wherein the alloy plated layer comprises: a diffusion layer comprising an Fe—Al-based intermetallic compound having a cubic structure; and an alloyed layer formed on the diffusion layer and composed of an alloy (Continued)

phase differing from that of the cubic structure, the thickness of the diffusion layer is 3-20 μm, and the thickness of the diffusion layer is greater than 50% of the total thickness of the plated layer.

7 Claims, 3 Drawing Sheets

(51) Int. Cl.
  *C22C 38/32* (2006.01)
  *C23C 2/12* (2006.01)
  *C23C 2/28* (2006.01)
  *C23C 2/40* (2006.01)
(52) U.S. Cl.
  CPC .............. *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/28* (2013.01); *C23C 2/40* (2013.01)
(58) Field of Classification Search
  USPC .......................................................... 428/653
  See application file for complete search history.

(56) References Cited

U.S. PATENT DOCUMENTS

| 2011/0300407 A1 | 12/2011 | Cho et al. |
| 2015/0361532 A1 | 12/2015 | Nam et al. |
| 2019/0381764 A1 | 12/2019 | Kang et al. |

FOREIGN PATENT DOCUMENTS

| JP | 2001-073108 A | 3/2001 |
| JP | 2003-034845 A | 2/2003 |
| JP | 2003-049256 A | 2/2003 |
| JP | 2012-514695 A | 6/2012 |
| JP | 2012-255204 A | 12/2012 |
| KR | 10-2010-0082537 A | 7/2010 |
| KR | 10-0988491 B1 | 10/2010 |
| KR | 10-2015-0075435 A | 7/2015 |
| KR | 10-1696121 B1 | 1/2017 |
| KR | 10-2017-0076234 A | 7/2017 |
| WO | 2014/181907 A1 | 11/2014 |
| WO | 2018/117769 A1 | 6/2018 |
| WO | 2018/158165 A1 | 9/2018 |
| WO | 2018/158166 A1 | 9/2018 |

OTHER PUBLICATIONS

Extended European Search Report dated Oct. 26, 2021 issued in European Patent Application No. 19891572.0.
International Search Report issued in corresponding International Patent Application No. PCT/KR2019/016766 dated Apr. 16, 2020.
Indian Office Action dated Feb. 24, 2022 issued in Indian Patent Application No. 202117028424 (with English translation).
Japanese Office Action dated Aug. 9, 2022 issued in Japanese Patent Application No. 2021-529449.

* cited by examiner

[FIG. 1]
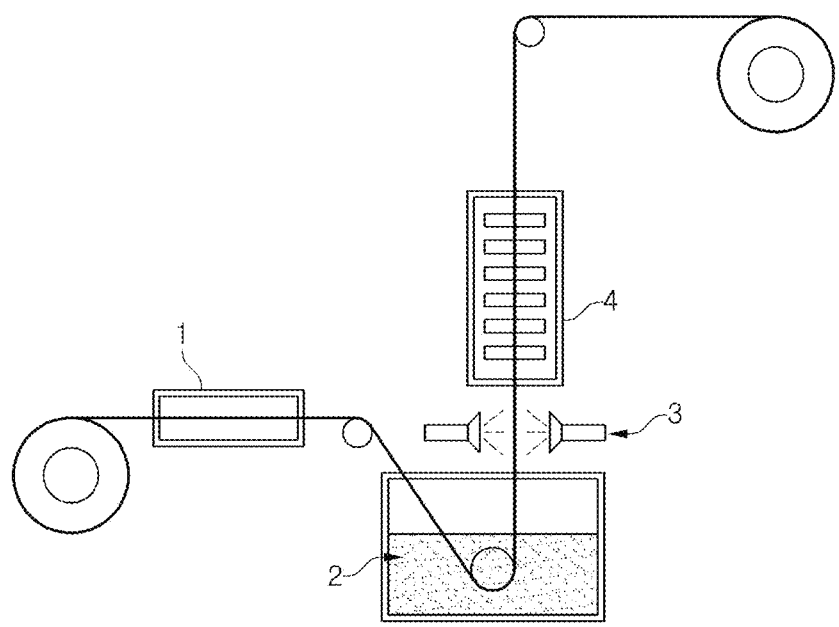
[FIG. 2]
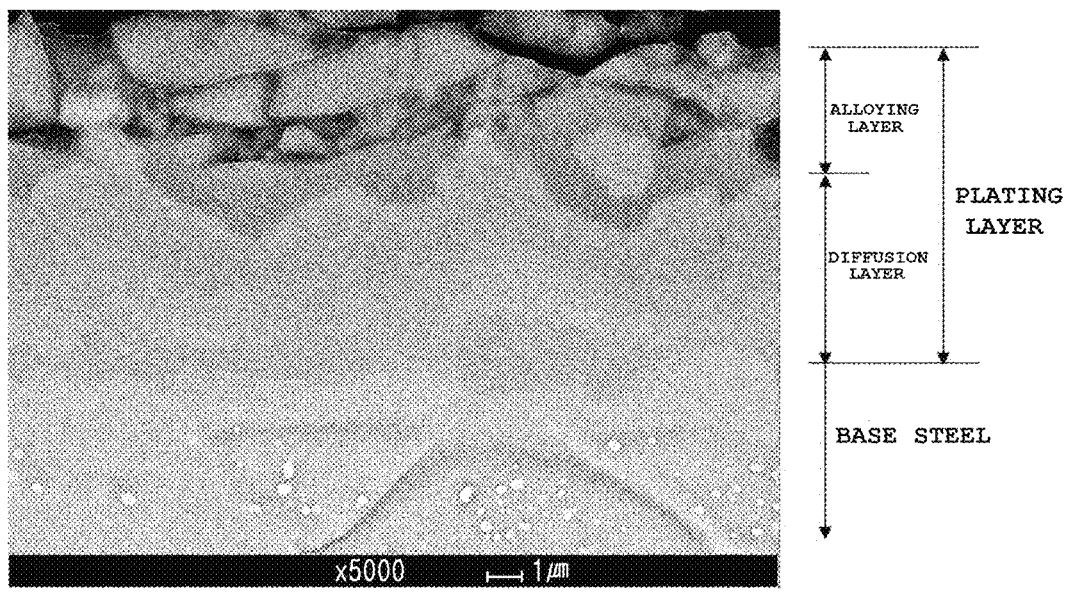

[FIG. 3]
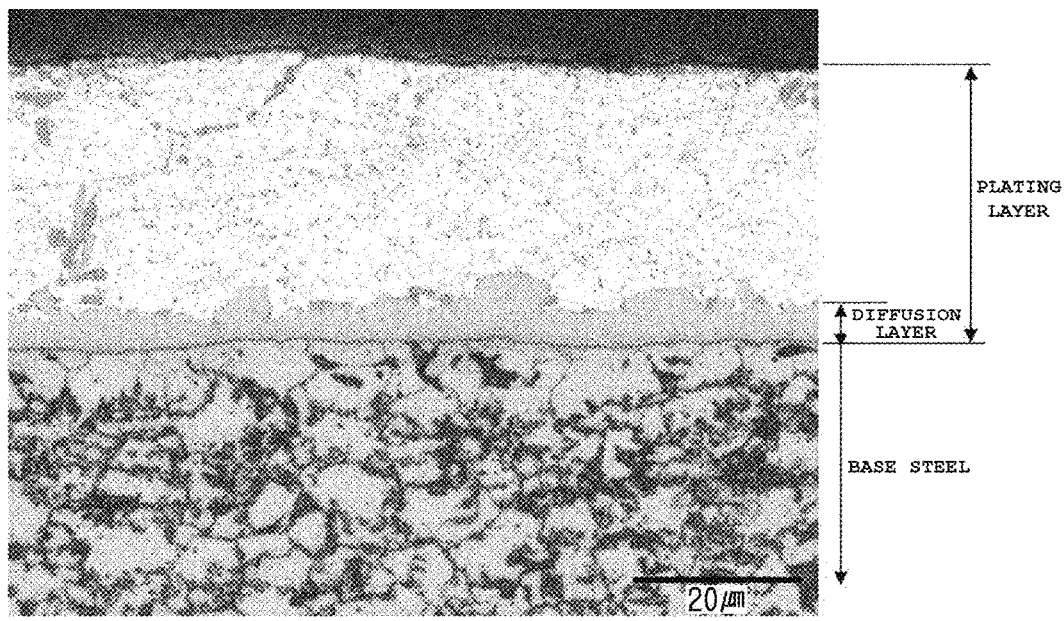
[FIG. 4]
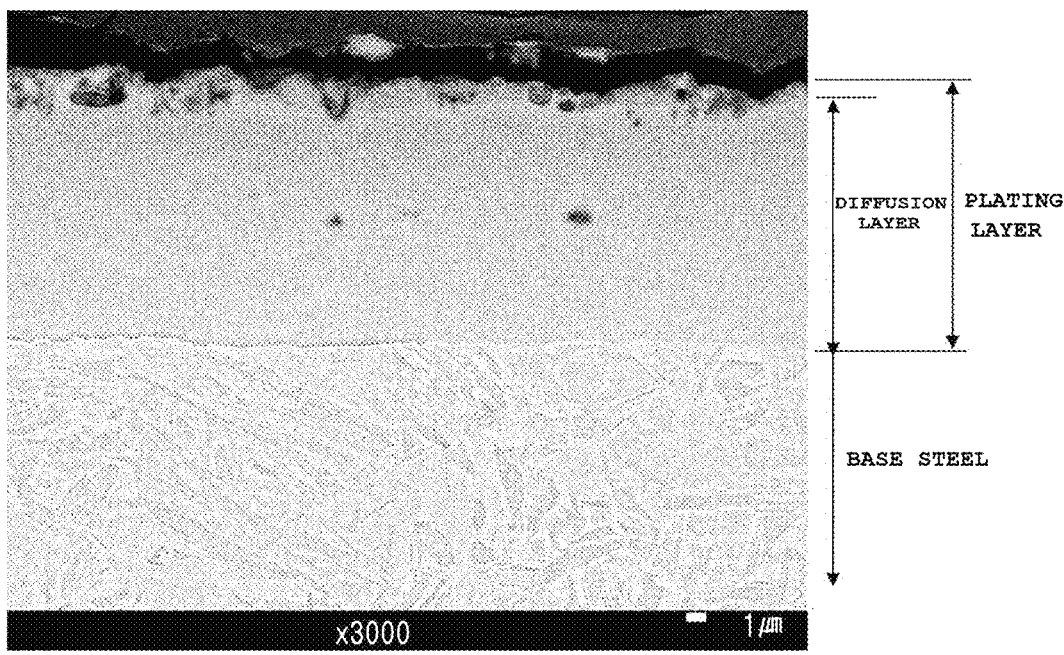

[FIG. 5]
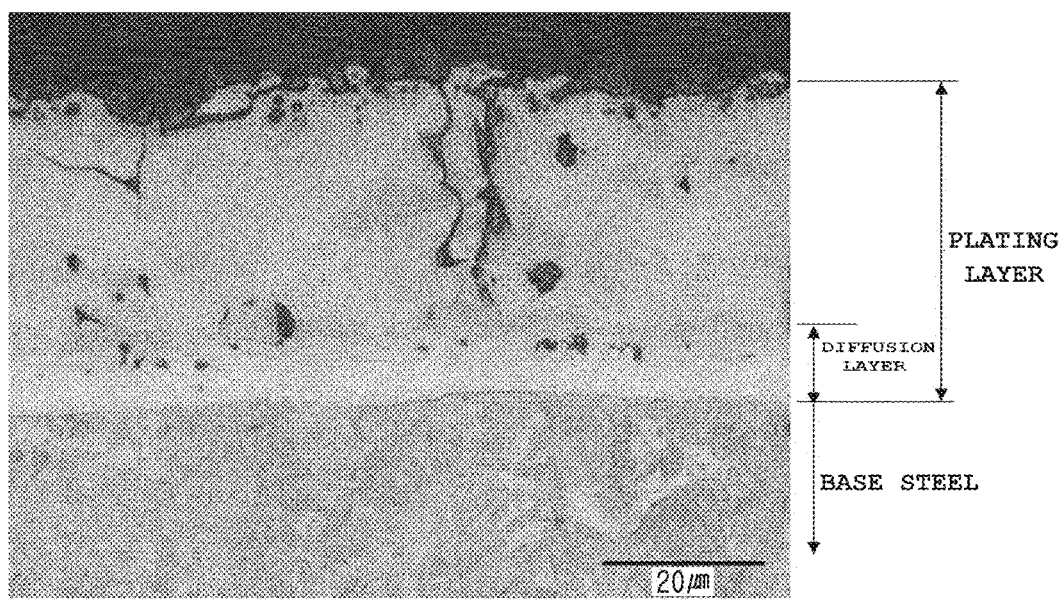

IRON-ALUMINUM-BASED PLATED STEEL SHEET FOR HOT PRESS FORMING, HAVING EXCELLENT HYDROGEN DELAYED FRACTURE PROPERTIES AND SPOT WELDING PROPERTIES, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/016766, filed on Nov. 29, 2019, which in turn claims the benefit of Korean Application Nos. 10-2018-0152573, filed on Nov. 30, 2018, and 10-2019-0156854, filed on Nov. 29, 2019 the entire disclosures of which applications are incorporated by reference herein.

TECHNICAL FIELD

The present disclosure relates to an iron-aluminum-based plated steel sheet for hot press forming, having excellent hydrogen delayed fracture properties and spot welding properties, and manufacturing method therefor.

BACKGROUND ART

In recent years, due to depletion of petroleum energy resources and high interest in the environment, regulations on improving fuel efficiency of automobiles have been strengthened. In terms of materials, reducing a thickness of a steel sheet used in automobiles may be a method for improving fuel efficiency of automobiles; however, reducing the thickness of a steel sheet may cause problems in automobile safety, and thus, in this case, improvement of strength of the steel sheet should be facilitated.

Thus, there has been continuous demand for high-strength steel sheets, and various kinds of steel sheets have been developed. However, since these steel sheets have high strength in themselves, workability thereof is poor. That is, since a product of strength and elongation for each grade of steel sheet tends to always have a constant value, when strength of the steel sheet increases, elongation, an index of workability, decreases.

In order to solve this problem, a hot press forming method has been proposed. The hot press forming method is a method of forming a low temperature structure, such as martensite, in the steel sheet by forming at a high temperature suitable for forming and then quenching the steel sheet at a low temperature structure to increase the strength of the final product. In this case, the problem of workability may be minimized when manufacturing a member having high strength.

However, in the case of the aforementioned hot press forming method, since the steel sheet has to be heated to have a high temperature, a surface of the steel sheet is oxidized, which additionally requires a process of removing oxides on the surface of the steel sheet after press forming. In order to solve this problem, patent document 1 was proposed. In this document, a steel sheet subjected to aluminum plating is used in a process of hot press forming or heating and quenching after room temperature forming (briefly, post-heat treatment). Since an aluminum plating layer is present on the surface of the steel sheet, the steel sheet is not oxidized at the time of heating, but an increase in thickness of the plating layer may deteriorate spot welding properties of the hot press formed member.

Meanwhile, when subjected to hot press forming, the steel sheet may have a strength of 1000 MPa or more, and in some cases, 1400 MPa or more. In recent years, the required level for strength has been further increased, and a steel sheet may have a strength of 1800 MPa or more. However, when strength of the steel sheet is increased, the steel sheet becomes sensitive to hydrogen delayed fracture, so even when a small amount of hydrogen is included, the steel sheet may be fractured. In addition, in the case of hot press forming an aluminum-plated steel sheet, Fe diffuses from a base steel of the steel sheet to the plating layer on the surface, resulting in alloying in the plating layer, and hydrogen penetrated during hot press forming cannot easily escape due to the alloying layer, so that hydrogen resistance properties of the hot press formed member become inferior.

(Patent document 1) U.S. Pat. No. 6,296,805

DISCLOSURE

Technical Problem

An aspect of the present disclosure may provide an iron-aluminum-based plated steel sheet for hot press forming having excellent resistance against hydrogen delayed fracture and spot welding properties, and a manufacturing method therefor.

The technical problem of the present disclosure is not limited to the aforementioned matters. Additional problems of the present disclosure are described in the overall contents of the disclosure, and those of ordinary skill in the art to which the present disclosure pertains will not have any difficulty in understanding the additional problems of the present disclosure from the contents described in the disclosure of the present disclosure.

Technical Solution

According to an aspect of the present disclosure, an iron-aluminum-based plated steel sheet used for hot press forming includes: a base steel sheet; and a plating layer formed on a surface of the base steel sheet, wherein the plating layer includes: a diffusion layer including a Fe—Al-based intermetallic compound having a cubic structure; and an alloying layer formed on the diffusion layer and having a crystal structure different from the cubic structure, wherein a thickness of the diffusion layer is 3 μm to 20 μm, and the thickness of the diffusion layer exceeds 50% of a total thickness of the plating layer.

A thickness of the plating layer may be 5 μm to 20 μm.

The plating layer may include, by wt %, 0.0001% to 7% of silicon (Si) and 1.1% to 15% of magnesium (Mg) when a remaining alloy composition excluding an Fe content diffused from the base steel sheet is 100%.

The base steel sheet may include, by wt %, 0.04% to 0.5% of carbon (C), 0.01% to 2% of silicon (Si), 0.01% to 10% of manganese (Mn), 0.001% to 1.0% of aluminum (Al), 0.05% or less of phosphorus (P), 0.02% or less of silicon (S), 0.02% or less of nitrogen (N), a balance of iron (Fe), and other inevitable impurities.

The base steel sheet may further include one or more of 0.01% to 4.0% of the sum of one or more selected from the group consisting of chromium (Cr), molybdenum (Mo), and tungsten (W), 0.001% to 0.4% of the sum of one or more selected from the group consisting of titanium (Ti), niobium (Nb), zirconium (Zr), and vanadium (V); 0.005% to 2.0% of copper (Cu)+nickel (Ni), 0.001% to 1.0% of antimony (Sb)+tin (Sn), and 0.0001% to 0.01% of boron (B).

According to another aspect of the present disclosure, a hot press formed member is obtained by hot press forming the above iron-aluminum-based plated steel sheet, in which the thickness of the diffusion layer may be 90% or more of the total thickness of the plating layer.

According to another aspect of the present disclosure, a method of manufacturing an iron-aluminum-based plated steel sheet includes: preparing a base steel sheet; obtaining an aluminum plated steel sheet through dipping the base steel sheet in an aluminum plating bath including, by wt %, 0.0001% to 7% of silicon (Si), 1.1% to 15% of magnesium (Mg), a balance of aluminum (Al), and other inevitable impurities to plate the base steel sheet with a coating amount of 10 to 40 g/m$^2$ per side; and obtaining an iron-aluminum-based plated steel sheet through online alloying of performing a heat treatment by maintaining the aluminum plated steel sheet for 1 to 20 seconds within a heating temperature range of 670° C. to 900° C. successively, without cooling the aluminum plated steel sheet, after the plating.

Advantageous Effects

As described above, in the present disclosure, since the stable diffusion layer mainly formed of an Fe—Al-based intermetallic compound having a cubic structure is formed in excess of 50% of a total thickness of the plating layer on a surface of the plated steel sheet before hot press forming, hydrogen delayed fracture properties and spot welding properties of the hot press formed member may be remarkably improved.

In addition, the present disclosure may provide a method for manufacturing an iron-aluminum-based plated steel sheet capable of reducing manufacturing costs and improving productivity, while forming a stable diffusion layer mainly formed of an Fe—Al-based intermetallic compound having a cubic structure, by appropriately controlling Si and Mg components of a plating bath and process conditions of an alloying heat treatment and immediately performing a heat treatment without performing cooling after hot dip aluminum plating.

DESCRIPTION OF DRAWINGS

FIG. 1 schematically illustrates a manufacturing apparatus implementing a manufacturing method according to an aspect of the present disclosure.

FIG. 2 is a photograph of a cross-section of an iron-aluminum-based plated steel sheet manufactured according to Inventive Example 1, observed with a scanning electron microscope (SEM).

FIG. 3 is a photograph of a cross-section of an iron-aluminum-based plated steel sheet manufactured by Comparative Example 8, observed with an optical microscope.

FIG. 4 is a photograph of a cross-section of a plating layer after hot press forming an iron-aluminum-based plated steel sheet manufactured according to Inventive Example 1, observed with an SEM.

FIG. 5 is a photograph of a cross-section of a plating layer after hot press forming an aluminum-based plated steel sheet prepared according to Comparative Example 8, observed with an optical microscope.

BEST MODE FOR INVENTION

Hereinafter, the present disclosure will be described in detail.

In the present disclosure, it should be appreciated that, when representing a content of each element, % refers to percent by weight (wt %), unless otherwise specified. In addition, the ratio of crystals or tissues is based on area unless otherwise indicated.

The inventors of the present disclosure studied in depth alloy phases of several layers formed of an Fe—Al-based intermetallic compound formed on an aluminum-plated steel sheet during conventional hot press forming, and found that alloy phases (e.g., FeAl(Si), Fe$_3$Al, etc.) having a cubic structure in the Fe—Al-based intermetallic compound are stable, while other alloy phases (e.g., FeAl$_3$, Fe$_2$Al$_5$, etc.) were brittle.

After a more in-depth study thereof, the inventors of the present disclosure found that hydrogen was removed from a member after hot press forming, and here, an aspect in which hydrogen was removed significantly varied depending on what kind of plating phase was formed on a surface of a steel sheet before hot press forming. In particular, it was found that, in the formed alloy phase, when an orthorhombic crystal phase such as Fe$_2$Al$_5$ was formed in a plating layer, movement of hydrogen was blocked and hydrogen in the steel sheet could not be discharged to the outside. Based on these results, the inventors of the present disclosure completed the present disclosure based upon recognition that, when a diffusion layer mainly formed of an Fe—Al-based intermetallic compound having a cubic structure is formed to exceed 50% of a total thickness of the plating layer, the diffusion layer is formed to be 90% or more in a member after hot press forming, thereby securing excellent hydrogen resistance properties.

Hereinafter, an iron-aluminum-based plated steel sheet according to an aspect of the present disclosure will be described in detail.

[Iron-Aluminum-Based Plated Steel Sheet]

An iron-aluminum-based plated steel sheet according to an embodiment of the present disclosure includes: a base steel sheet; and a plating layer formed on a surface of the base steel sheet, wherein the plating layer includes: a diffusion layer including a Fe—Al-based intermetallic compound having a cubic structure; and an alloying layer formed on the diffusion layer and having a crystal structure different from the cubic structure, wherein a thickness of the diffusion layer is 3 μm to 20 μm, and the thickness of the diffusion layer exceeds 50% of a total thickness of the plating layer.

In general, when hot press forming is performed on an aluminum-plated steel sheet, Fe of a base steel sheet is diffused into an aluminum plating layer having a high Al content, resulting in an Fe—Al-based intermetallic compound, which is a variety of hard alloy phases of several layers. In this case, a layer mainly formed of the Fe—Al-based intermetallic compound having a cubic structure with excellent resistance to hydrogen embrittlement is formed on a side close to the base steel sheet, and is stable, but an alloy phase having a crystal structure such as orthorhombic system or the like is formed in a direction toward the surface. However, when such a crystal phase is formed in the plating layer, movement of hydrogen is blocked so that hydrogen in the steel sheet cannot be discharged to the outside, degrading hydrogen resistance properties.

In order to solve the problem of the related art, in the iron-aluminum-based plated steel sheet according to an aspect of the present disclosure, a diffusion layer formed of an Fe—Al-based intermetallic compound having a cubic structure is formed to meet a condition of 3 μm to 20 μm and exceeding 50% of a total thickness of the plating layer, as shown in FIG. 2.

First, according to an embodiment of the present disclosure, the diffusion layer may include an Fe—Al-based intermetallic compound having a cubic structure. In addition, the diffusion layer may mainly include the Fe—Al-based intermetallic compound having a cubic structure.

Specifically, according to an embodiment of the present disclosure, the diffusion layer may include 50% or more of an Fe—Al-based intermetallic compound having a cubic structure, preferably 80% or more, more preferably 90% or more, and most preferably 95% or more.

In addition, according to an embodiment of the present disclosure, the diffusion layer mainly includes an Fe—Al-based intermetallic compound having a cubic structure and may also include inevitable impurities and a small amount of other elements that may be included in a plating bath.

For example, when Mg is added, Mg may be partially included in an alloy phase of the Fe—Al-based intermetallic compound in the diffusion layer, and the diffusion layer may include other alloy phases including the Fe—Al—Mg-based alloy phase.

It may be formed of an Fe—Al-based intermetallic compound having a cubic structure. In the Fe—Al-based intermetallic compound, the cubic structure is formed in a region with a relatively high Fe content, and is formed as Fe of the base steel sheet is diffused into the aluminum plating layer during an alloying heat treatment. In addition, an alloy phase of the Fe—Al-based intermetallic compound having a cubic structure may include FeAl(Si), Fe$_3$Al, etc. but is not limited thereto.

If the thickness of the diffusion layer is less than 3 μm, corrosion resistance is inferior, whereas if the thickness of the diffusion layer exceeds 20 μm, welding properties is deteriorated. Therefore, the thickness of the diffusion layer is preferably limited to a thickness of 3 μm to 20 μm, and more preferably 3.7 μm to 17.9 μm.

In addition, the thickness of the diffusion layer may be more than 50% of a total thickness of the plating layer including the alloying layer, or may be more than 54%. The thickness of the diffusion layer may be preferably 70% or more, and more preferably 90% or more. When the thickness of the diffusion layer exceeds 50% of the total thickness of the plating layer, a plating layer structure in which the thickness of the Fe—Al-based intermetallic compound having a cubic structure occupies 90% or more in the plating layer of the hot press formed member may be easily obtained. From a viewpoint of hydrogen resistance, a higher proportion of the Fe—Al-based intermetallic compound having a cubic structure is more preferable, and thus an upper limit thereof may not be limited.

In addition, the thickness of the plating layer may be 4.5 μm to 20 μm. If the thickness of the plating layer is less than 4.5 μm, corrosion resistance may be inferior, while if the thickness of the plating layer exceeds 20 μm, it may be difficult to secure a diffusion layer more than 50% in the plating layer before hot press forming, and if ever, the thickness of the plating layer may be too thick after hot press forming, making it difficult to secure spot welding properties. Therefore, in the present disclosure, the thickness of the plating layer may be 4.5 μm to 20 μm, more preferably 4.5 μm to 18.9 μm.

According to an embodiment of the present disclosure, the plating layer may include, by wt %, 0.0001% to 7% of Si, 1.1% to 15% of Mg, a balance of Al, and other inevitable impurities, when a remaining alloy composition excluding the Fe content diffused from the base steel sheet is 100%.

In more detail, in an embodiment of the present disclosure, Si may be included in an amount of 0.0001% to 7%. Si serves to make alloying uniform with Fe in the plating layer, and in order to obtain such an effect, Si needs to be included in an amount of at least 0.0001% or more. Meanwhile, since Si also serves to inhibit diffusion of Fe, and thus, if Si is included in excess of 7%, diffusion of Fe may be excessively inhibited, and thus a desired plating structure may not be obtained in the present disclosure. The Si content may be 0.03% to 7%, preferably 1% to 7%, and more preferably 4% to 7%.

Meanwhile, Mg serves to improve corrosion resistance of the plated steel sheet and has an effect of increasing an alloying rate. In order to obtain the above effect, Mg needs to be included in an amount of at least 1.1% or more, but if Mg is included in excess of 15%, welding properties and paintability may be degraded. Thus, an Mg content may be 1.2% to 12.5%, more preferably 1.1% to 10%, and most preferably 1.1% to 5%. In addition, Mg in the plating layer tends to diffuse toward the surface, and thus, the Mg content measured at a depth of 0.5 μm from the surface of the plating layer with a glow discharge spectrometer (GDS) may be 1 wt % to 20 wt %.

According to an embodiment of the present disclosure, oxygen measured at a depth of 0.1 μm from the surface of the plating layer with a GDS may be 10 wt % or less, and the GDS may be GDS 850A (device name) of LECO of the United States. If oxygen on the surface of the plating layer exceeds 10 wt %, stains may occur on the surface of the plated steel sheet, resulting in poor surface quality. Meanwhile, the less oxygen on the surface of the plating layer is more advantageous, and thus, a lower limit of the oxygen content may not be limited.

According to an embodiment of the present disclosure, the base steel sheet (base iron), as a steel sheet for hot press forming, may not be particularly limited when used in hot press forming. However, as a non-limiting example, the base steel sheet may have a composition including, by wt %, 0.04% to 0.5% of carbon (C), 0.01% to 2% of silicon, 0.01% to 10% of manganese (Mn), 0.001% to 1.0% of aluminum (Al), 0.005% or less of phosphorus (P), 0.002% or less of silicon (Si), and 0.02% of less of nitrogen (N).

C: 0.04% to 0.5%

Carbon (C) may be added in an appropriate amount as an essential element to increase strength of a heat treatment member. That is, in order to ensure sufficient strength of the heat treatment member, C may be added in an amount of 0.04% or more. Preferably, a lower limit of the C content may be 0.1% or more. However, if the C content is too high, when a cold rolled material is produced, strength of a hot rolled material is too high when cold rolling the hot rolled material, and thus, cold rolling properties may be significantly deteriorated and spot welding properties may be significantly lowered. Therefore, in order to ensure sufficient cold rolling property and spot welding properties, carbon (C) may be added in an amount of 0.5% or less. Also, the C content may be 0.45% or less, and more preferably, the C content may be limited to be 0.4% or less.

Si: 0.01% to 2%

Silicon (Si) should be added as a deoxidizer in steel making and also serves to inhibit an occurrence of a carbide, which has the greatest effect on strength of the hot rolled press formed member. In the present disclosure, Si may be added in an amount of 0.01% or more to secure residual austenite by concentrating carbon at martensite lath grain boundaries after the formation of martensite in hot press forming. In addition, an upper limit of the Si content may be set to 2% to ensure sufficient plating properties when performing aluminum plating on the steel sheet after rolling. Preferably, the Si content may be limited to 1.5% or less.

Mn: 0.01% to 10%

Manganese (Mn) may be added in an amount of 0.01% or more to lower a critical cooling rate for securing martensite in the hot press formed member, as well as securing a solid solution strengthening effect. In addition, the Mn content may be limited to 10% or less in that hot press forming process workability is secured, manufacturing costs is reduced, and spot welding properties is improved by appropriately maintaining strength of the steel sheet. Preferably, the Mn content may be 9% or less, and in some cases, 8% or less.

Al: 0.001% to 1.0%

Aluminum (Al) may increase cleanliness of the steel by deoxidizing the steel together with Si and may be added in an amount of 0.001% or more to obtain the above effect. In addition, the content of Al may be limited to 1.0% or less to prevent the Ac3 temperature from becoming too high, so that heating required during hot press forming may be performed within an appropriate temperature range.

P: 0.05% or Less

Phosphorus (P) is present as an impurity in the steel and a less content thereof is advantageous. Accordingly, in the present disclosure, the P content may be limited to 0.05% or less, and preferably, may be limited to 0.03% or less. Since a smaller amount of P is advantageous, there is no need to specifically set an upper limit of the content. However, excessive lowering the P content may lead to an increase in manufacturing costs, and in consideration thereof, a lower limit of the P content may be set to 0.001%.

S: 0.02% or Less

Since sulfur (S) is an impurity in the steel and is an element that inhibits ductility, impacts characteristics and welding properties of the member, thus, a maximum content of S is limited to 0.02%, and preferably, to 0.01% or less. In addition, if a minimum content thereof is less than 0.0001%, manufacturing costs may increase, so a lower limit of the S content may be set to 0.0001%.

N: 0.02% or Less

Nitrogen (N) is an element included as an impurity in the steel. In order to reduce sensitivity to crack occurrence and secure impact characteristics during continuous slab casting, and, a lower content thereof is more advantageous, and therefore, N may be included in an amount of 0.02% or less. Although it is not necessary to set a lower limit, the N content may be set to 0.001% or more in consideration of an increase in manufacturing costs.

In the present disclosure, optionally as necessary, in addition to the aforementioned steel composition, 0.01% to 4.0% of the sum of one or more selected from the group consisting of Cr, Mo, and W, 0.001% to 0.4% of the sum of one or more selected from the group consisting of Ti, Nb, Zr, and V, 0.005% to 2.0% of Cu+Ni, 0.001% to 1.0% of Sb+Sn, and 0.0001% to 0.01% of B may be additionally added.

The sum of one or more selected from the group consisting of Cr, Mo and W: 0.01% to 4.0%

Since the Cr, Mo and W may secure strength and grain refinement through the improvement of hardenability and precipitation strengthening effect, one or more thereof may be added by 0.01% or more based on the total content. In addition, in order to secure welding properties of the member, the content may be limited to 4.0% or less. In addition, if the content of these elements exceeds 4.0%, the effect is saturated, so the content may be limited to 4.0% or less.

The sum of one or more selected from the group consisting of Ti, Nb, Zr, and V: 0.001% to 0.4%

The Ti, Nb, and V are effective in improving the strength of the heat treatment member by forming fine precipitates, stabilizing residual austenite and improving impact toughness by grain refinement, so one or more thereof may be added by 0.001% or more based on the total content. However, if the added amount exceeds 0.4%, the effect may be saturated and cost may increase due to excessive addition of ferroalloy.

Cu+Ni: 0.005% to 2.0%

Copper (Cu) and nickel (Ni) are elements that improve strength by forming fine precipitates. In order to obtain the aforementioned effect, the sum of one or more of these components may be 0.005% or more. However, if the value exceeds 2.0%, costs may be excessively increased, and thus, an upper limit thereof may be set at 2.0%.

Sb+Sn: 0.001% to 1.0%

Antimony (Sb) and tin (Sn) are concentrated on the surface during an annealing heat treatment for Al—Si plating to inhibit the formation of Si or Mn oxide on the surface, thereby improving plating properties. 0.001% or more of Sb+Sn may be added to obtain such an effect. However, an addition amount of Sb+Sn exceeding 1.0% may incur excessive ferroalloy cost and cause Sb and Sn to be dissolved along grain boundaries of a slab to cause coil edge cracks during a hot rolling process. Thus, an upper limit thereof is set to 1.0%.

B: 0.0001% to 0.01%

The addition of even a small amount of boron (B) improves hardenability. B segregates along prior-austenite grain boundaries to inhibit embrittlement of a hot press formed member based on grain boundary segregation of P and S. Thus, B may be added by 0.0001% or more. If the boron content exceeds 0.01%, the effect is saturated and causes brittleness at hot rolling, and thus, an upper limit of the boron content may be set to 0.01%, and in an implementation example, the boron content may be set to 0.005% or less.

The balance other than the aforementioned components may include iron (Fe) and inevitable impurities, and addition of a component that may be included in the steel sheet for hot press forming may not be particularly limited.

When the iron-aluminum-based plated steel sheet including the plating layer having the aforementioned layer structure is heat-treated in a temperature range of 880° C. to 950° C. for 3 to 10 minutes and then hot press formed to manufacture a hot press formed member, at least 90% of the plating layer of the hot press formed member may be formed of an Fe—Al-based intermetallic compound having a cubic structure, and thus, hydrogen that has penetrated into the steel material may easily escape during hot press forming and a diffusive hydrogen content in the steel material may be 0.1 ppm or less, thereby improving hydrogen resistance properties. In addition, a spot welding current range satisfies 1 kA or more, so that spot welding properties may be improved.

Hereinafter, a method of manufacturing an iron-aluminum-based plated steel sheet for hot press forming according to another aspect of the present disclosure will be described in detail. However, the following method of manufacturing an iron-aluminum-based plated steel sheet for hot press forming is only an example and it does not mean that the iron-aluminum-based plated steel sheet for hot press forming according to the present disclosure must be manufactured by this manufacturing method. It should be appreciated that any method may be used to implement each embodiment of the present disclosure if it satisfies the claims of the disclosure.

[Method of Manufacturing Iron-Aluminum-Based Plated Steel Sheet]

An iron-aluminum-based plated steel sheet according to another aspect of the present disclosure may be obtained by performing aluminum plating on a surface of a hot rolled or cold rolled base steel sheet with a coating amount of 10~40 g/m² per side and performing an online alloying treatment by performing a heat-treatment immediately after the plating process.

Step of Obtaining an Aluminum Plated Steel Sheet

In an embodiment of the present disclosure, a base steel sheet is prepared and immersed in an aluminum plating bath including, by wt %, 0.0001% to 7% of Si, 1.1% to 15% of Mg, a balance of Al, and other inevitable impurities to plate a surface of the base steel sheet with aluminum with a coating amount of 10 to 40 g/m² per side to obtain an aluminum plated steel sheet. Meanwhile, the coating amount may be more preferably 11 to 38 g/m² per side. In addition, annealing may be selectively performed on the steel sheet before plating.

Step of Spraying Aluminum Powder

After the aluminum plating, aluminum powder may be sprayed on the surface of the aluminum-plated steel sheet as needed. The aluminum powder not only cools the surface locally but also may refine surface spangle. Here, when only the surface is locally cooled by aluminum powder, diffusion of Mg in the plating layer to the surface in the subsequent online alloying process may be more inhibited, thereby reducing a Mg oxide generated by diffusion of Mg to the surface after hot press forming and improving spot welding properties. In addition, the surface may be uniformly formed after hot press forming by refining the surface spangle.

An average particle diameter of the aluminum powder may be 5 μm to 40 μm, and more preferably 10 μm to 30 μm. If the average particle diameter of the aluminum powder is less than 5 μm, the surface cooling and spangle refinement effect may be insufficient, whereas if the average particle diameter exceeds 40 μm, the aluminum powder may not be sufficiently dissolved in the plating layer and remain on the surface, resulting in a surface quality problem.

In the present disclosure, a spraying amount of the aluminum powder may be determined within a limit that satisfies a condition that a surface temperature does not fall below 640° C. after powder spraying. If the surface temperature of the steel sheet after powder spraying falls below 640° C., more power has to be applied for alloying in a subsequent online alloying heat treatment, causing an equipment load. The spraying amount of the aluminum powder is related to the surface temperature of the steel sheet, but the surface temperature of the steel sheet may vary significantly depending on process conditions, equipment, and environmental conditions at the time of implementation, and thus cannot be uniformly determined. Therefore, since the spraying amount of aluminum powder satisfying the above condition may be sufficient, and a specific range of the spraying amount may not be particularly limited. However, as a non-limiting example, the aluminum powder may be sprayed within a range of 0.01 to 10 g per 1 m² of the aluminum plated steel sheet.

Step of Obtaining Iron-Aluminum-Based Plated Steel Sheet by Performing Alloying Heat Treatment After the aluminum plating, an online alloying treatment of performing a heat treatment immediately after performing minimal air cooling may be performed. In addition, in the case of selectively spraying aluminum powder after aluminum plating, the online alloying treatment may be performed immediately after powder spraying. Here, a heating temperature range during the alloying heat treatment may be 670° C. to 900° C., and a holding time may be 1 to 20 seconds.

In the present disclosure, the online alloying treatment refers to a process of heat treatment by heating after minimum air cooling after hot-dip aluminum plating or hot-dip aluminum plating and aluminum powder spraying, as shown in FIG. 1. In the online alloying method according to the present disclosure, since the heat treatment starts before the plating layer is cooled and hardened after hot-dip aluminum plating, the heat treatment may be performed within a short time without requiring a separate heating process. In the general aluminum-plated steel sheet having a thick plating layer, alloying could not be completed within a short time due to a thickness thereof, and thus, it was difficult to apply the online alloying method of performing a heat-treatment immediately after plating. In contrast, in the present disclosure, alloying of the aluminum plating layer may be effectively completed despite a short heat treatment time of 1 to 20 seconds by adjusting the plating bath components described above and controlling a coating amount of the aluminum plating layer to 10 to 40 g/m² per side.

The heating temperature is based on a surface temperature of the steel sheet to be heat-treated. If the heating temperature is lower than 670° C., insufficient alloying may occur. Meanwhile, if the heating temperature exceeds 900° C., it is difficult to cool after alloying, and if the cooling rate is increased, strength of the base steel sheet may become too high. Therefore, the heating temperature during the alloying heat treatment is preferably limited to 670° C. to 900° C., more preferably 680° C. to 880° C., and most preferably 700° C. to 800° C.

Meanwhile, during the alloying heat treatment, the holding time may be limited to 1 to 20 seconds. In the present disclosure, the holding time refers to a time during which the heating temperature (including deviation ±10° C.) is maintained in the steel sheet. If the holding time is less than 1 second, the heating time is too short to achieve sufficient alloying. Meanwhile, if the holding time exceeds 20 seconds, productivity may be too low. Therefore, the holding time during the alloying heat treatment is preferably limited to 1 to 20 seconds, more preferably 1 to 12 seconds, and most preferably 1 to 10 seconds.

The formation of the diffusion layer through the alloying heat treatment depends on a heat treatment temperature and a holding time and is also affected by the content of Si and Mg included in the aluminum plating layer. As the amount of Si included in the aluminum plating layer decreases and the amount of Mg increases, an alloying rate may increase, and thus the thickness of the diffusion layer may increase. In the case of performing the online heat treatment as in the present disclosure, since the heat treatment time is relatively very short compared to a phase annealing method, a diffusion layer having a sufficient thickness cannot be obtained unless the process conditions are precisely controlled. Accordingly, the inventors of the present disclosure controlled the Si and Mg contents and heat treatment conditions, thereby effectively obtaining a diffusion layer having a sufficient thickness despite a short heat treatment time of 1 to 20 seconds.

Meanwhile, according to another embodiment of the present disclosure, a hot press formed member obtained by hot press forming the iron-aluminum-based plated steel sheet of the present disclosure may be provided. Here, hot press forming may use a method generally used in the art. For example, the iron-aluminum-based plated steel sheet according to the present disclosure may be heated in a temperature range of 880° C. to 950° C. for 3 to 10 minutes, and the heated steel sheet may be hot press formed to have a desired shape using pressing, but the present disclosure is not limited thereto. In addition, in the hot press formed member of the present disclosure, a thickness of a diffusion layer formed of an Fe—Al-based intermetallic compound having a cubic structure on a surface of a base steel sheet may be 90% or more of the total thickness of a plating layer. In addition, a composition of the base steel sheet of the hot press formed member may be the same as a composition of the base steel sheet of the iron-aluminum-based plated steel sheet described above.

MODE FOR INVENTION

Hereinafter, the present disclosure will be described more specifically by way of example. It should be noted that the following examples are intended to illustrate the present disclosure in more detail and to not limit the scope of the present disclosure. The scope of the present disclosure may be determined by the matters described in the claims and the matters reasonably deduced therefrom.

Example

First, a cold-rolled steel sheet for hot press forming having the composition of Table 1 below was prepared as a base steel sheet, and aluminum plating and alloying heat treatment were performed on a surface of the base steel sheet with a plating bath composition, a plating bath temperature of 660° C., and an alloying heat treatment conditions shown in Table 2.

After cooling followed by the alloying heat treatment, a structure of an alloyed plating layer of the iron-aluminum plated steel sheet obtained by the above method was observed with an optical microscope and a scanning electron microscope (SEM) to identify a thickness of the plating layer and the diffusion layer.

In addition, an energy dispersive spectroscopy (EDS) analysis was performed on a diffusion layer portion of FIG. 2 observed with an alloyed layer portion by the SEM to confirm phases of $Fe_3Al$ and $FeAl$ having a cubic structure.

In addition, in FIG. 2, an EDS analysis was performed on a portion of the alloyed layer formed on the diffusion layer to detect, by wt %, 48% of Al, 50% of Fe, and 2% of Si, and it was confirmed that the phase was $Fe_2Al_5$ having an orthorhombic structure, not a cubic structure.

TABLE 1

| Element | C | Si | Mn | Al | P | S | N | Cr | Ti | B |
|---|---|---|---|---|---|---|---|---|---|---|
| Content (%) | 0.22 | 0.20 | 1.2 | 0.03 | 0.01 | 0.002 | 0.0054 | 0.2 | 0.03 | 0.0025 |

TABLE 2

| | Aluminum plating condition | | | Average particle diameter of Al (μm) | Alloying heat treatment condition | | Plating layer of steel sheet | | |
|---|---|---|---|---|---|---|---|---|---|
| Classification | Coating amount (g/m²) | Si content (Wt. %) | Mg content (Wt. %) | | Temperature (° C.) | Time (sec.) | Thickness of plating layer (μm) | Thickness of diffusion layer (μm) | Ratio of thickness of diffusion layer (%) |
| Inventive Example1 | 38 | 6.8 | 12.5 | 25 | 680 | 10 | 15.1 | 8.2 | 54 |
| Inventive Example 2 | 38 | 6.8 | 12.5 | 25 | 800 | 10 | 16.8 | 10.2 | 61 |
| Inventive Example 3 | 38 | 6.8 | 12.5 | 25 | 880 | 10 | 17.8 | 12.5 | 70 |
| Comparative Example 1 | 38 | 6.8 | 12.5 | 25 | 600 | 10 | 13.3 | 6.1 | 46 |
| Comparative Example 2 | 38 | 6.8 | 12.5 | 25 | 950 | 10 | 23.3 | 21.2 | 91 |
| Inventive Example 4 | 37 | 1.2 | 10.7 | 30 | 680 | 1 | 16.2 | 10.8 | 67 |
| Inventive Example 5 | 37 | 1.2 | 10.7 | 30 | 800 | 1 | 17.8 | 13.5 | 76 |
| Inventive Example 6 | 37 | 1.2 | 10.7 | 30 | 880 | 1 | 18.9 | 17.9 | 95 |
| Comparative Example 3 | 37 | 1.2 | 10.7 | 30 | 680 | 0.1 | 15.4 | 7.2 | 47 |
| Comparative Example 4 | 37 | 1.2 | 10.7 | 30 | 600 | 5 | 15.1 | 2.9 | 19 |
| Comparative Example 5 | 37 | 1.2 | 10.7 | 30 | 880 | 25 | 22.7 | 19.4 | 85 |
| Comparative Example 6 | 37 | 1.2 | 10.7 | 30 | 950 | 5 | 27.4 | 26.8 | 98 |
| Inventive Example 7 | 15 | 4.2 | 5.3 | 10 | 680 | 3 | 5.5 | 3.8 | 69 |
| Inventive Example 8 | 15 | 4.2 | 5.3 | 10 | 800 | 3 | 5.7 | 4.7 | 82 |
| Inventive Example 9 | 15 | 4.2 | 5.3 | 10 | 880 | 3 | 5.8 | 5.6 | 97 |

TABLE 2-continued

| | Aluminum plating condition | | | Average particle diameter of Al (μm) | Alloying heat treatment condition | | Plating layer of steel sheet | | |
|---|---|---|---|---|---|---|---|---|---|
| | | | | | | | Thickness of plating | Thickness of diffusion | Ratio of thickness |
| Classification | Coating amount (g/m²) | Si content (Wt. %) | Mg content (Wt. %) | | Temperature (° C.) | Time (sec.) | layer (μm) | layer (μm) | of diffusion layer (%) |
| Inventive Example 10 | 11 | 0.03 | 1.2 | 16 | 680 | 12 | 4.5 | 3.7 | 82 |
| Inventive Example 11 | 11 | 0.03 | 1.2 | 16 | 800 | 12 | 5.2 | 4.5 | 87 |
| Inventive Example 12 | 11 | 0.03 | 1.2 | 16 | 880 | 12 | 5.7 | 5.4 | 95 |
| Comparative Example 7 | 35 | 5.5 | 0 | 3 | 800 | 10 | 5.7 | 2.8 | 49 |
| Comparative Example 8 | 50 | 6.5 | 7.8 | 18 | 800 | 10 | 26.7 | 5.5 | 21 |
| Comparative Example 9 | 35 | 13.4 | 1.5 | 55 | 800 | 10 | 17.8 | 2.4 | 13 |
| Comparative Example 10 | 35 | 0 | 17.8 | 22 | 800 | 10 | 34.7 | 18.9 | 54 |

Thereafter, each iron-aluminum-based steel sheet was heated at 930° C. for 6 minutes in an atmospheric atmosphere and was subsequently subjected to hot press forming to obtain a hot press formed member. Thereafter, a structure of a plating layer of the member was observed to measure a content of diffusible hydrogen and spot welding properties, which are shown in Table 3 below. To measure the content of diffusible hydrogen, a hydrogen content discharged by heating the sample to 300° C. was measured using a gas chromatography technique, and spot welding properties were evaluated based on ISO 18278 to analyze a current range.

TABLE 3

| | Iron-aluminum-based plated steel sheet | | Hot press formed member | | |
|---|---|---|---|---|---|
| Classification | Ratio of thickness of diffusion layer (%) | Content of diffusible hydrogen (ppm) | Ratio of thickness of diffusion layer (%) | Content of diffusible hydrogen (ppm) | Spot welding current range (kA) |
| Inventive Example 1 | 54 | 0.01 | 99 | 0.05 | 1.6 |
| Inventive Example 2 | 61 | 0.02 | 100 | 0.04 | 1.6 |
| Inventive Example 3 | 70 | 0.01 | 100 | 0.02 | 1.4 |
| Comparative Example 1 | 46 | 0.02 | 82 | 0.24 | 1.8 |
| Comparative Example 2 | 91 | 0.02 | 100 | 0.03 | 0.6 |
| Inventive Example 4 | 67 | 0.01 | 96 | 0.08 | 1.6 |
| Inventive Example 5 | 76 | 0.007 | 96 | 0.07 | 1.6 |
| Inventive Example 6 | 95 | 0.01 | 97 | 0.06 | 1.4 |
| Comparative Example 3 | 47 | 0.01 | 75 | 0.28 | 1.8 |
| Comparative Example 4 | 19 | 0.01 | 52 | 0.52 | 1.8 |
| Comparative Example 5 | 85 | 0.02 | 100 | 0.05 | 0.4 |
| Comparative Example 6 | 98 | 0.01 | 100 | 0.05 | 0.2 |
| Inventive Example 7 | 69 | 0.02 | 97 | 0.06 | 2.2 |
| Inventive Example 8 | 82 | 0.01 | 100 | 0.02 | 2.0 |
| Inventive Example 9 | 97 | 0.02 | 100 | 0.03 | 2.0 |
| Inventive Example 10 | 82 | 0.01 | 100 | 0.03 | 1.6 |
| Inventive Example 11 | 87 | 0.008 | 100 | 0.02 | 1.6 |
| Inventive Example 12 | 95 | 0.01 | 100 | 0.02 | 1.6 |
| Comparative Example 7 | 49 | 0.01 | 48 | 0.58 | 2.0 |
| Comparative Example 8 | 21 | 0.004 | 64 | 0.34 | 1.6 |
| Comparative Example 9 | 13 | 0.02 | 35 | 0.6 | 0.4 |
| Comparative Example 10 | 54 | 0.01 | 94 | 0.08 | 0.8 |

As can be seen in Tables 1 to 3, Inventive Examples 1 to 12 satisfy all of the plating bath components and the alloying heat treatment conditions presented in the present disclosure, and the ratio of the thickness of the diffusion layer including an alloy phase of the Fe—Al-based intermetallic compound having a cubic structure in the plated steel sheet was 50% or more.

In addition, it can be seen that the diffusive hydrogen content in the steel was 0.1 ppm or less, and the spot welding current range satisfied 1 kA or more when the hot press formed member was manufactured, so that the hydrogen delayed fracture properties and spot welding properties are excellent.

However, in Comparative Examples 1 and 4, the alloying heat treatment temperature was lower than 670° C., and Comparative Example 1 had a diffusion layer thickness ratio of 50% or less because the diffusion layer was not sufficiently formed, and Comparative Example 4 had a diffusion layer having a thickness less than 3 μm. Accordingly, in the hot press formed members manufactured with the plated steel sheets of Comparative Examples 1 and 4, the ratio of the thickness of the diffusion layer was less than 90%, and hydrogen did not easily escape, so that the content of diffusible hydrogen was 0.1 ppm or more, degrading hydrogen resistance.

In Comparative Examples 2 and 6, the alloying heat treatment temperature exceeded 900° C., and the thickness of the plating layer and the diffusion layer exceeded 20 μm. Accordingly, in the hot press formed member, the spot welding point current range was less than 1 kA, resulting in poor spot welding properties.

Meanwhile, Comparative Examples 3 and 5 are cases in which a holding time during the alloying heat treatment is outside of the range of the present disclosure. In the case of Comparative Example 3, the heat treatment time was too short to sufficiently form the diffusion layer, so the ratio of the thickness of the diffusion layer of the hot press formed member was low as 75%, degrading hydrogen resistance. In addition, in the case of Comparative Example 6, the heat treatment time was as long as 25 seconds, so that the thickness of the plating layer exceeded 20 μm, resulting in poor spot welding properties.

Comparative Examples 7, 9 and 10 are examples in which the Si or Mg content of components of the aluminum plating bath does not satisfy the conditions of the present disclosure. Comparative Example 7 is a case in which Mg was not added and Comparative Example 9 is a case in which Si was added in excess of 7%, and the diffusion layer was not sufficiently formed due to a low alloying rate. As a result, the content of diffusible hydrogen in the steel increased in the hot press formed member, hydrogen resistance decreased. In addition, in Comparative Example 10, Mg was added in excess of 15%, so that the plating layer was formed to a thickness exceeding 20 μm, and accordingly, spot welding properties were poor.

Comparative Example 8 is a case in which the amount of aluminum plating is outside of the scope of the present disclosure, the thickness of the plating layer increased to 26.7 μm, the ratio of the thickness of the diffusion layer was reduced to degrade hydrogen resistance.

While embodiments of the present disclosure have been shown and described, it will be apparent to those skilled in the art that modifications and variations could be made without departing from the scope of the present disclosure. Therefore, the scope of the present disclosure is not limited to the embodiments but should be defined by the appended claims and equivalents thereof.

DETAILED DESCRIPTION OF MAIN ELEMENTS

1: HEAT TREATMENT FURNACE
2: ALUMINUM PLATING BATH
3: ALUMINUM POWDER SPRAY DEVICE
4: ALLOYING HEAT TREATMENT DEVICE

The invention claimed is:

1. An iron-aluminum-based plated steel sheet for hot press forming, the iron-aluminum-based plated steel sheet comprising:
a base steel sheet; and
a plating layer formed on a surface of the base steel sheet,
wherein the plating layer includes:
a diffusion layer including a Fe—Al-based intermetallic compound having a cubic structure; and
an alloying layer formed on the diffusion layer and having a crystal structure different from the cubic structure,
wherein a thickness of the diffusion layer is 3 μm to 20 μm, and the thickness of the diffusion layer exceeds 50% of a total thickness of the plating layer.

2. The iron-aluminum-based plated steel sheet of claim 1, wherein a thickness of the plating layer is 5 μm to 20 μm.

3. The iron-aluminum-based plated steel sheet of claim 1, wherein the plating layer includes, by wt %, 0.0001% to 7% of silicon (Si), 1.1% to 15% of magnesium (Mg), a balance of aluminum (Al), and other inevitable impurities, when a remaining alloy composition excluding an Fe content diffused from the base steel sheet is 100%.

4. The iron-aluminum-based plated steel sheet of claim 1, wherein the base steel sheet includes, by wt %, 0.04% to 0.5% of carbon (C), 0.01% to 2% of silicon (Si), 0.01% to 10% of manganese (Mn), 0.001% to 1.0% of aluminum (Al), 0.05% or less of phosphorus (P), 0.02% or less of silicon (S), 0.02% or less of nitrogen (N), a balance of iron (Fe), and other inevitable impurities.

5. The iron-aluminum-based plated steel sheet of claim 4, wherein the base steel sheet further includes, by wt %, one or more of 0.01% to 4.0% of the sum of one or more selected from the group consisting of chromium (Cr), molybdenum (Mo), and tungsten (W), 0.001% to 0.4% of the sum of one or more selected from the group consisting of titanium (Ti), niobium (Nb), zirconium (Zr), and vanadium (V), 0.005% to 2.0% of copper (Cu)+nickel (Ni), 0.001% to 1.0% of antimony (Sb)+tin (Sn), and 0.0001% to 0.01% of boron (B).

6. A hot press formed member obtained by hot press forming the iron-aluminum-based plated steel sheet according to claim 1, wherein the thickness of the diffusion layer is 90% or more of the total thickness of the plating layer.

7. The hot press formed member of claim 6, wherein a content of diffusible hydrogen in the hot press formed member is 0.1 ppm or less, and a spot welding current range of the hot press formed member is 1 kA or more.

* * * * *